(12) United States Patent
Laborde

(10) Patent No.: US 6,333,116 B1
(45) Date of Patent: Dec. 25, 2001

(54) CRYSTALLIZING GLASS FRIT COMPOSITION FOR FORMING GLASS RIB STRUCTURES

(75) Inventor: Pascale Laborde, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/313,483

(22) Filed: May 17, 1999

Related U.S. Application Data
(60) Provisional application No. 60/094,536, filed on Jul. 29, 1998.

(30) Foreign Application Priority Data

May 27, 1998 (FR) .................................................. 98 401264

(51) Int. Cl.⁷ ............................ C03C 3/062; B32B 17/00
(52) U.S. Cl. .......................... 428/432; 428/426; 428/428; 501/73; 501/74; 345/37; 345/41
(58) Field of Search ...................................... 428/426, 428, 428/325, 432; 501/11, 15, 17, 32, 73, 74, 23; 345/37, 41

(56) References Cited

U.S. PATENT DOCUMENTS

| | | | | |
|---|---|---|---|---|
| 5,244,484 | * | 9/1993 | Chiba et al. | 62/24 |
| 5,332,412 | * | 7/1994 | Manabe et al. | 65/60.2 |
| 5,477,105 | * | 12/1995 | Curtin et al. | 313/422 |
| 5,723,945 | * | 3/1998 | Schermerhorn | 313/581 |
| 5,853,446 | | 12/1998 | Carre et al. . | |

FOREIGN PATENT DOCUMENTS 6-239646 * 8/1994 (JP) .

* cited by examiner

*Primary Examiner*—Deborah Jones
*Assistant Examiner*—Jennifer McNeil
(74) *Attorney, Agent, or Firm*—Maurice M Klee; Angela N. Nwaneri

(57) ABSTRACT

A lead silicate glass frit composition particularly useful for the formation of dielectric layers and barrier ribs in plasma display panels.

13 Claims, No Drawings

CRYSTALLIZING GLASS FRIT COMPOSITION FOR FORMING GLASS RIB STRUCTURES

CROSS REFERENCE TO RELATED PROVISIONAL APPLICATION

This application claims the benefit under 35 USC §119(e) of U.S. Provisional Application No. 60/094,536 filed Jul. 29, 1998, the content of which in its entirety is hereby incorporated by reference.

FIELD OF THE INVENTION

The invention relates to lead silicate glass frit compositions useful for forming freestanding glass structures, in particular, glass rib barrier layers such as are used in plasma flat panel display applications.

BACKGROUND OF THE INVENTION

Color plasma display panels have been considered the most suitable flat display device for large sized applications, and are believed to be adaptable to high definition television, as well as other visual display applications. Typically, such display panels are formed of two parallel substrates separated from each other to form a discharge space therebetween in which a discharge gas, such as a mixture of neon, xenon, and helium, is filled. The inner-facing surface of each of the substrates bears a pattern of spaced parallel electrodes, with the electrodes on one substrate being oriented in a direction that intersects the direction of the electrodes on the other substrate. The electrode bearing surfaces of the substrates are typically covered with a dielectric layer, and red, green and blue phosphors are located on the internal surface of the dielectric layer on one of the two substrates. The Dielectric layers are generally lead-based glass frits fired between 500 and 600° C., depending on their formulation and the level of uniformity required. The display picture is produced by plasma discharges which are induced locally in the gas by applying a suitable voltage between the electrodes of one substrate and the electrodes of the other substrate. Ultraviolet light emitted locally by the gas discharge induces luminescence of the neighboring phosphors.

In order to prevent luminous cross-talk between neighboring pixels in such displays, barrier ribs are typically disposed vertically or as closed cells, on at least one of the substrates (typically the rear one) in order to optically insulate each discharge cell. These ribs are typically formed either by sandblasting or screen printing glass frits containing low melting temperature glasses such as lead silicates and zinc, lead, or phosphate glasses. The barrier rib structure is typically periodic with a pitch of from 200 $\mu$m to 400 $\mu$m, depending on the panel resolution. These ribs are about 30–80 $\mu$m wide and 100–200 $\mu$m thick. Alternatively, a closed cell design has been employed having square cells which are about 200–400 $\mu$m on each side. The "ribs" which form these square cells are about 30 $\mu$m to 70 $\mu$m wide and about 30 to 200 $\mu$m high.

The frit containing materials used in the preparation of the dielectric layers and barrier ribs are often provided with a quantity of crystalline filler, e.g. a crystalline material selected from the group consisting of mineral, ceramic, or glass ceramic materials. Typically, such crystalline materials have a coefficient of thermal expansion and are employed in an amount so that, over the temperature range of 0 to 300° C., the average or resultant coefficient of thermal expansion of the frit containing material is between about 77 to 90×10$^{-7}$/°C. Such fillers assist in preventing misalignment of the various layers of the plasma structures during their consolidation. In particular, the fillers promote surface nucleated crystallization of the frit that improves the mechanical strength and enhances the rigidity of the frit. This technique is very useful to prevent excessive flow and is therefore used in dielectric layers as well as barrier ribs to maintain structural geometry after firing.

The frits used in the barrier ribs and the dielectric layers are typically of different formulations. This is generally necessary if sand blasting processes are used to form the barrier ribs on the surface of the dielectric layers to prevent removal of the dielectric layer between the ribs. Recently, however, a process has been developed that allows the simultaneous formation of the dielectric layer and barrier ribs in a single step. According to this process, the barrier ribs and dielectric layer can be formed on the substrate by an embossing or intaglio printing process. The method and apparatus for accomplishing this result are described in detail in U.S. patent application Ser. No. 08/820,206 filed Mar. 18, 1997, the disclosure of which is expressly incorporated herein by reference.

Accordingly, to effectuate the advantages inherent in such a process, glass frit compositions suitable for both the dielectric layer and barrier ribs are necessary. Additionally, it would be advantageous for such frits to devitrify without the addition of fillers such as zircon, alumina or glass ceramic fillers commonly added to promote surface nucleated crystallization. These needs are fulfilled by the glass frit compositions described herein.

SUMMARY OF THE INVENTION

The present invention relates to glass frit compositions that are particularly well-suited for use in the formation of dielectric layers and barrier ribs utilized in plasma display panels. The compositions permit the simultaneous formation of the dielectric layers and the barrier ribs, which significantly simplifies their manufacture. Further, the compositions are initially devitrified during the melt through internal crystallization without the need for the addition of crystalline fillers, and provide, when consolidated under normal processing conditions at temperatures of from about 520 to about 580° C., desired shape retention. As a consequence, the glass frit compositions of the invention typically exhibit great compaction after firing, resulting in a low porosity and surface roughness. These attributes lead to better control of the thickness and homogeneity of the dielectric layers, which are important in obtaining uniform electrical behavior over their surface.

In one embodiment of the invention, the glass frits comprise by weight, 18 to 24 percent silica ($SiO_2$), 69 to 80 percent PbO, and 1 to 3 percent titania ($TiO_2$). Optionally, the composition may contain up to 15 percent zirconia ($ZrO_2$), as well as small quantities of ceramic dielectric materials such as $BaTiO_3$.

DETAILED DESCRIPTION OF THE PREFERRED EMBODIMENTS OF THE INVENTION

The lead glass frit compositions of the present invention provide crystallized glass formulations that can be used alone to form structures having a glossy aspect, or made milky reflectant by the addition of pigments. Additionally, the dielectric properties of the resulting structures can be adapted by the addition of small quantities of specific ceramic dielectric materials such as $BaTiO_3$.

Unlike the prior art, wherein various glass frits are used to provide the dielectric layers and the barrier rib structure, the present composition provides a single material formulation that can be used in both of these layers. The composition of this invention exhibits minimal variations in glass substrate dimensions when the substrate is heated up to its annealing range, and allows the formation of structures with very good dimensional shape control when consolidated in a temperature range of about 520 to about 580° C., preferably at about 550° C. In particular, due to its strong devitrifying character, which may be augmented by the addition of $ZrO_2$ to the glass frit composition, combined with a softening point in the range of from about 450 to about 550° C., the level of compaction that occurs during firing is high, and the resulting glass substrate has low porosity and surface roughness. As a result, it is possible to control dimensional shapes precisely at a given temperature (preferably at about 550° C.) and achieve a glass substrate exhibiting improved mechanical strength and uniformity. Furthermore, the thermal expansion coefficient is maintained in the range of from about 70 to about 90 * $10^{-7}$/° C. to prevent stresses and cracks induced by potential excessive expansion mismatch between the substrate (generally a sodalime glass) and the dielectric layers.

The crystallizing glasses of this invention are lead silicate materials containing $TiO_2$. The glass frit compositions of this invention contain, on a weight percent basis: 18 to 24 percent $SiO_2$; 69 to 80 percent PbO; and 1 to 3 percent $TiO_2$. Optionally, the composition may include from 0 to 15 percent $ZrO_2$. In a preferred embodiment, the composition comprises on a weight percent basis 18 to 24% $SiO_2$; 71 to 77% PbO, 1 to 8% $ZrO_2$, and its most preferred form contains about 19% $SiO_2$, 74% PBO, 2% $TiO_2$, and 5% $ZrO_2$. These frits are formed by: (1) melting constituents at about 1350° C.; (2) at the end of the melting cycle, or typically after about 3 hours at the above-mentioned temperature, and after cooling down to about 1250° C., pouring the melt into water in order to form a fritted material; and (3) drying the resulting frit in an oven. A residual part of the material is cast in the form of a plate, in order to allow the characterization of the bulk material. The frit material formed is in the form of small, irregularly shaped fragments which are crushed and sieved in several steps, until sufficiently fine average grain size, suitable for the application, is obtained. Typically, these crystallized glass frit are ground to particles of less than 20 microns, and most preferably between 5 and 10 microns.

The glass frit compositions of the invention may be formed into the dielectric layers and barrier ribs by any conventional method, but are particularly well-suited for the simultaneous formation of both by an embossing or intaglio printing process as disclosed in U.S. patent application Ser. No. 08/820,206. In such processes, the frit is dispersed in a suitable organic binder and the resulting mixture is either applied to the surface of the substrate and formed into the desired shape by contact with an embossing plate or roll, or it is applied to an intaglio plate or roll and then printed onto the substrate surface. Both of such methods are described in detail in the above referenced patent application.

The glass frit compositions of the invention are further illustrated by the following examples.

EXAMPLES

Exemplary formulations of the invention are shown in Table 1, wherein the compositions are expressed in terms of the weight percent of the various components. For each of these sample formulations, the thermal expansion coefficient (CTE) expressed as $10^{-7}$/° C., the glass transition temperature (Tg) expressed in ° C., and the glass softening point ($T_s$,) expressed in ° C. of the glasses formed upon firing the frit are also provided.

Further, the ability of the sample frit compositions to keep a given geometric shape is expressed as the percentage of the height and diameter of a button of frit retained after the firing cycle. In this characterization, pressed buttons of 20 mm height and 10 mm diameter were made from ball-milled and 300 mesh sieved frit. These buttons were then fired at 500° C. for 25 minutes. After firing, the new dimensions were measured. Example 5, for instance, presents a height ratio of 69% and a diameter ratio of 103%, which indicates a moderate flow from the initial shape. A vitreous frit with the same softening point would typically present a much higher flow, often corresponding to a height ratio lower than about 40% and a diameter ratio higher than about 130%. Higher softening points generally increase the height ratio and decrease the diameter ratio as shown in Table 1. However, softening point values below about 550° C., are generally preferred to maintain good sintering.

Additionally, the dielectric constant was measured for the glass formed by firing the frit composition of sample 1.

TABLE 1

| EXAMPLE | 1 | 2 | 3 | 4 | 5 | 6 | 7 |
|---|---|---|---|---|---|---|---|
| composition (wt %) | | | | | | | |
| SiO2 | 24 | 19 | 19 | 19 | 19 | 19 | 19 |
| PbO | 74 | 74 | 77 | 71 | 79 | 75 | 76 |
| ZrO2 | 0 | 5 | 2 | 8 | 0 | 4 | 3 |
| TiO2 | 2 | 2 | 2 | 2 | 2 | 2 | 2 |
| CTE ($10^{-7}$/° C.) | 73.9 | 74.9 | 80.1 | 77.6 | 85.3 | 73.7 | 83.5 |
| Tg (° C.) | 459 | 465 | 462 | 433 | 426 | 463 | 455 |
| Ts (° C.) | 514 | 516 | 500 | 542 | 465 | 514 | 503 |
| Flow button (550° C., 25 mn) | | | | | | | |
| Height ratio | 75% | 82% | 83% | 83% | 69% | 82% | 78% |
| Diameter ratio | 94% | 89% | 88% | 89% | 103% | 91% | 100% |
| Dielectric constant, 1 kHz, RT | 12.9 | | | | | | |

Although the invention has been described above in detail for the purpose of illustration, it is understood that numerous variations and alterations may be made by the skilled artisan without departing from the spirit and scope of the invention defined by the following claims.

What is claimed is:

1. A lead silicate glass frit composition consisting essentially of, on a weight percent basis, 18 to 24% $SiO_2$, 69 to 80% PbO, 1 to 3% $TiO_2$, and 0 to 15% $ZrO_2$.

2. The glass frit composition of claim 1, wherein said PbO is present in an amount of from 71 to 77%.

3. The glass frit composition of claim 1, wherein said $ZrO_2$ is present in an amount of from 2 to 8%.

4. The glass frit composition of claim 3, wherein said $SiO_2$ is present in an amount of from 18 to 24% and said PbO is present in an amount of from 71 to 77%.

5. The glass frit composition of claim 4, wherein said $SiO_2$ is present in an amount of about 19%, said PbO is present in an amount of about 74%, said $TiO_2$ is present in an amount of about 2% and said $ZrO_2$ is present in an amount of about 5%.

6. The glass frit composition of claim 1, wherein said coefficient of thermal expansion is from about 73 to about $86 \times 10^{-7}$° C.

7. The glass frit composition of claim 1, wherein said glass transition temperature is from about 425° C. to about 465° C.

8. The glass frit composition of claim 1, wherein the softening point of the glass is from about 500 to about 550° C.

9. The glass frit composition of claim 8, wherein said softening temperature is from about 510 to about 520° C.

10. A plasma display panel comprising a glass substrate coated with a dielectric layer formed of a thermally fused glass frit comprising, on a weight percent basis, 18 to 24% $SiO_2$, 69–80% PbO and 1 to 3% $TiO_2$.

11. The plasma display panel of claim 10, further comprising barrier ribs formed of a thermally fused glass frit comprising, on a weight percent basis, 18 to 24% $SiO_2$, 69–80% PbO and 1 to 3% $TiO_2$.

12. The plasma display panel of claim 11, wherein said dielectric layer and barrier ribs are formed from glass frits of the same composition.

13. A plasma display panel comprising barrier ribs formed of a thermally fused glass frit comprising, on a weight percent basis, 18 to 24% $SiO_2$, 69–80% PbO and 1 to 3% $TiO_2$.

* * * * *